United States Patent
Mosher et al.

(10) Patent No.: US 7,244,485 B2
(45) Date of Patent: *Jul. 17, 2007

(54) IMAGEABLE SEAMED BELTS HAVING POLYAMIDE ADHESIVE BETWEEN INTERLOCKING SEAMING MEMBERS

(75) Inventors: Ralph A. Mosher, Rochester, NY (US); T. Edwin Freeman, Webster, NY (US); Theodore Lovallo, Williamson, NY (US); Damodar M. Pai, Fairport, NY (US); John F. Yanus, Webster, NY (US); Timothy J. Fuller, Pittsford, NY (US); Markus R. Silvestri, Fairport, NY (US); Gerald M. Fletcher, Pittsford, NY (US); Antonio DeCrescentis, Rochester, NY (US); Ihor W. Tarnawskyj, Webster, NY (US)

(73) Assignee: Xerox Corporation, Stamford, CT (US)

( * ) Notice: Subject to any disclaimer, the term of this patent is extended or adjusted under 35 U.S.C. 154(b) by 1060 days.

This patent is subject to a terminal disclaimer.

(21) Appl. No.: 09/833,546

(22) Filed: Apr. 11, 2001

(65) Prior Publication Data

US 2002/0150408 A1    Oct. 17, 2002

(51) Int. Cl.
*B32B 3/00* (2006.01)

(52) U.S. Cl. .................. 428/59; 428/57; 428/429; 428/412; 428/325; 428/327; 156/272.8; 156/256; 399/175; 528/332; 528/335; 430/58.65; 430/132; 430/60; 430/56; 430/64; 524/440

(58) Field of Classification Search ............... 528/332, 528/335; 428/429, 412, 325, 327, 57; 399/175; 156/272.8, 256; 430/58.65, 132, 60, 56, 430/64; 525/440

See application file for complete search history.

(56) References Cited

U.S. PATENT DOCUMENTS

| | | | |
|---|---|---|---|
| 4,297,477 A * | 10/1981 | Nakata et al. | 528/323 |
| 4,340,480 A | 7/1982 | Pall et al. | |
| 4,856,781 A * | 8/1989 | Shishido et al. | 473/603 |
| 5,034,295 A | 7/1991 | Allen et al. | 430/58 |
| 5,066,557 A | 11/1991 | Robinette et al. | 430/58 |
| 5,089,364 A | 2/1992 | Lee et al. | 430/58 |
| 5,112,708 A * | 5/1992 | Okunuki et al. | 430/31 |
| 5,473,064 A | 12/1995 | Mayo et al. | 540/141 |
| 5,492,785 A | 2/1996 | Normandin et al. | 430/58 |
| 5,663,283 A * | 9/1997 | Sakakibara et al. | 528/310 |
| 5,686,214 A | 11/1997 | Yu | 430/58 |
| 5,721,032 A * | 2/1998 | Parker et al. | 24/38 |

(Continued)

FOREIGN PATENT DOCUMENTS

EP    0 928 907    7/1999

OTHER PUBLICATIONS

Handbook of Themoset Plastics, CP 1998, Landis et al., p. 426.*

*Primary Examiner*—Rena Dye
*Assistant Examiner*—Tamra L. Dicus
(74) *Attorney, Agent, or Firm*—Annette L. Bade

(57) ABSTRACT

A seamed flexible belt having a substrate and a seam having interlocking seam members, wherein the interlocking seam members are held together by an adhesive having polyamide and an optional electrically conductive filler, for use in electrostatographic, contact electrostatic, digital and other like printing machines.

23 Claims, 10 Drawing Sheets

U.S. PATENT DOCUMENTS

| | | |
|---|---|---|
| 5,940,662 A | 8/1999 | Hano et al. .................. 399/175 |
| 5,942,360 A | 8/1999 | Janezic et al. ................. 430/58 |
| 5,997,974 A * | 12/1999 | Schlueter et al. ............. 428/58 |
| 6,004,709 A * | 12/1999 | Renfer et al. ............ 430/58.65 |
| 6,025,102 A | 2/2000 | Pai et al. .................... 430/58.8 |
| 6,040,102 A | 3/2000 | Takahashi et al. .......... 430/108 |
| 6,096,470 A * | 8/2000 | Fuller et al. ................. 430/132 |
| 6,096,927 A | 8/2000 | Parikh et al. ............... 564/434 |
| 6,099,996 A | 8/2000 | Yanus et al. ................ 430/58.8 |
| 6,099,997 A | 8/2000 | Terrell et al. ............... 430/59.1 |
| 6,130,024 A | 10/2000 | Aylward et al. ............. 430/256 |
| 6,136,484 A | 10/2000 | Katayama et al. ............. 430/63 |
| 6,174,635 B1 | 1/2001 | Terrell et al. .................. 430/56 |
| 6,387,465 B1 * | 5/2002 | Yuan et al. .................... 428/58 |
| 6,602,156 B2 * | 8/2003 | Schlueter, Jr. ............... 474/253 |

\* cited by examiner

FIG. 11
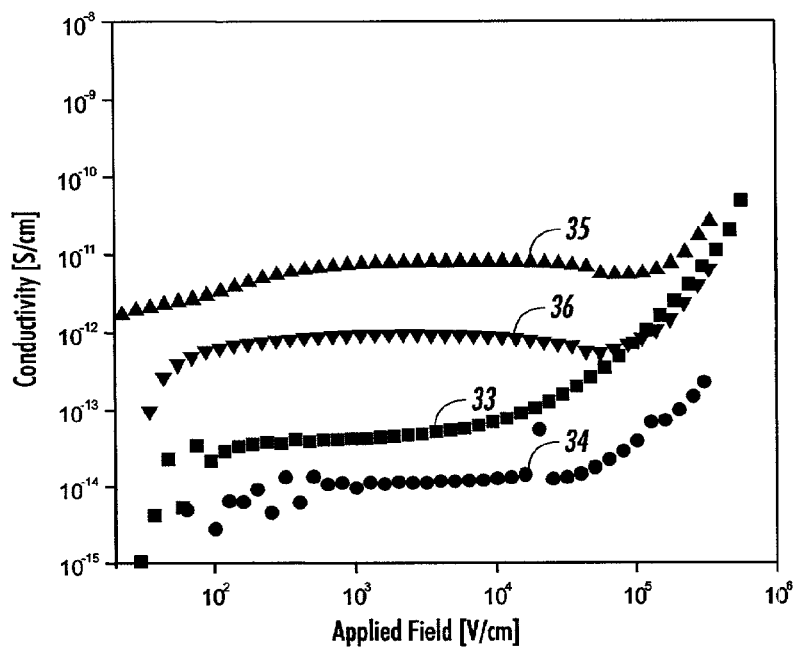
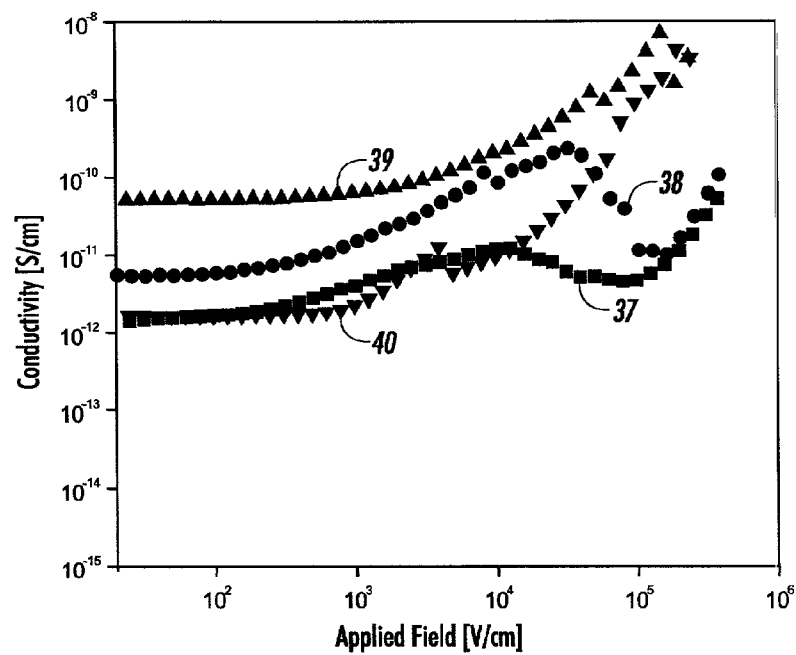
FIG. 12

IMAGEABLE SEAMED BELTS HAVING POLYAMIDE ADHESIVE BETWEEN INTERLOCKING SEAMING MEMBERS

CROSS REFERENCE TO RELATED APPLICATIONS

Attention is directed to U.S. patent application Ser. No. 09/493,445, filed Jan. 28, 2000, entitled "Process and Apparatus for Producing an Endless Seamed Belt;" U.S. patent application Ser. No. 09/470,931 filed Dec. 22, 1999, entitled, "Continuous Process for Manufacturing Imageable Seamed Belts for Printers;" U.S. patent application Ser. No. 09/088,011, filed May 28, 1998, entitled, "Unsaturated Carbonate Adhesives for Component Seams;" U.S. patent application Ser. No. 09/615,444, filed Jul. 13, 2000, entitled, "Polyimide Adhesive For Polyimide Component Interlocking Seams;" U.S. patent application Ser. No. 09/615,426, filed Jul. 13, 2000, entitled. "Process For Seaming Interlocking Seams Of Polyimide Component Using Polyimide Adhesive"; U.S. patent application Ser. No. 09/660,248, filed Sep. 13, 2000, entitled, "Imageable Seamed Belts Having Fluoropolymer Adhesive Between Interlocking Seaming Members;" U.S. patent application Ser. No. 09/660,249, filed Sep. 13, 2000, entitled, "Imageable Seamed Belts Having Fluoropolymer Overcoat;" U.S. patent application Ser. No. 09/833,930, filed Apr. 11, 2001, entitled, "Imageable Seamed Belts Having Hot Melt Processable, Thermosetting Resin and Conductive Carbon Filler Adhesive Between Interlocking Seaming Members;" U.S. patent application Ser. No. 09/833,965, filed Apr. 11, 2001, entitled, "Conductive Carbon Filled Polyvinyl Butyral Adhesive;" U.S. patent application Ser. No. 09/833,488, filed Apr. 11, 2001, entitled, "Dual Curing Process for Producing a Puzzle Cut Seam;" and U.S. patent application Ser. No. 09/833,507 filed Apr. 11, 2001, entitled "Polyamide and Conductive Filler Adhesive." The disclosures of each of these references are hereby incorporated by reference in their entirety.

BACKGROUND OF THE INVENTION

The present invention is directed to transfer members useful in electrostatographic, including digital printing apparatuses. In specific embodiments, the present invention is directed to seamed belts, and more specifically, to endless flexible seamed belts wherein an image can be transferred at the seam of the belt with little or no print defects caused by the seam. In embodiments, the present invention relates to xerographic component Imageable seamed belts comprising an adhesive formed between mutually mating elements of a seam, wherein the adhesive comprises a polymer, optionally with electrically conductive filler dispersed or contained therein. In a particularly preferred embodiment, the polymer is a polyamide. Preferably, the filler, if present, is an electrically conductive filler such as a carbon filler, a metal oxide filler, a polymer filler, a charge-transporting molecule, or a mixture thereof. The present invention further provides, in embodiments, a belt having a seam with increased strength because the adhesive is crosslinked. However, the belt is still flexible enough to withstand 180° crease without cracking. The present invention, in embodiments, also provides a belt having a seam in which the height differential between the seam and the rest of the belt is virtually nil. The belt, in embodiments, allows for image transfer at the seam, which cannot be accomplished with known seamed belts. Image transfer is accomplished partly because the present seam possesses the desired conductivity and release properties required for sufficient transfer. The present invention also provides, in embodiments, a ripple-free seam. Further, in embodiments, the seam can be rapidly cured at relatively low temperatures. In addition, the seam, in embodiments, is resistant to alcohol and organic solvents. Moreover, in embodiments, there is no tenting in the seam area. The seam, in embodiments, can withstand repeated electrical transfer cycles and remain functional. In embodiments, the adhesive withstands temperature transients between 25 and 130° C., and is resistant to ambient changes in relative humidity. The seam is virtually to totally invisible to the xerographic imaging process.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

In a more typical electrostatic reproducing apparatus, the developer consists of polymeric coated magnetic carrier beads and thermoplastic toner particles of opposite triboelectric polarity with respect to the carrier beads. This is the dry xerographic process.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member electrostatically or under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer imaging members are suitable for high performance applications because of their outstanding mechanical strength and thermal stability, in addition to their good resistance to a wide range of chemicals. However, the high cost of manufacturing unseamed polyimide belts has led to the introduction of a seamed belt. Even polyimides with the best mechanical and chemical properties often exhibit poor adhesion at the seam even when commercially available primers and adhesives are used.

In the electrostatic transfer applications, use of a seamed transfer polyimide member results in insufficient transfer in that the developed image occurring on the seam is not adequately transferred. This incomplete transfer is partially the result of the difference in seam height to the rest of the belt. A "bump" is formed at the seam, thereby hindering transfer and mechanical performance. The development of puzzle cut seams has increased the quality of transfer somewhat, by decreasing the seam height, thereby allowing smooth cycling. However, even with the improvements made with puzzle cut seams, quality imaging in the seamed area has not been obtainable at present due, in part, to contrast in transfer caused by differences in electrical and release properties of known seaming adhesives. Further, current adhesives do not provide sufficient bonding strength at the seam, resulting in short belt life. In addition, the seam must have the appropriate surface properties in order to allow for sufficient toner release at the seam.

Currently, puzzle cut and overlap seam adhesives consist of uv-curable epoxies and hot-melt adhesives. While these adhesives exhibit acceptable strengths at room temperature under tensile load, most undergo premature failure at elevated temperatures. Additionally, the existing adhesives have been found to perform poorly under some important dynamic test conditions. Because the adhesive seam is not Imageable, most machines do not develop images on the seam area, or non-seamed belts are used.

Improved seam adhesives such as polyamic acid adhesives, have proven to be strong. However, adhesives such as polyamic acid adhesives require long cure times at elevated temperatures (for example, 1 hour at 200° C.) with loss of water as the polyimide seam is formed. The resulting differential shrinkage causes ripples as the adhesive cures and the cured seams are not completely filled with adhesive. If one side of the puzzle cut seam is glued, tenting occurs. If both sides of the puzzle cut seam are treated with polyamic acid adhesive, ripples form. Such ripples in the seam cause uneven development and ultimately result in print defects, and a reduced belt life. Thus, adhesive alternatives to polyamic acid must be considered.

Therefore, it is desired to provide an adhesive system useful to seam puzzle cut seamed belts, wherein the height differential between the seam and the rest of the belt is virtually nil, and the occurrence of ripples and tenting in the seam is reduced or eliminated. It is further desirable to provide an adhesive that has a low temperature rapid cure in order to increase production of the belts at a reduced production cost. It is also desirable to provide an adhesive that is resistant to alcohol and organic solvents. Further, it is desired to provide an adhesive having electrical, mechanical and toner release characteristics that closely match those of the substrates. Also, it is desirable to provide an adhesive which is able to withstand transients in temperatures between 25 and 130° C., and which is resistant to humidity changes. In addition, it is desirable to provide a seam, which is Imageable; thereby reducing or eliminating the presence of print or copy defects. It is desirable to have a low temperature-curing adhesive to eliminate ripple and substrate defects due to differential shrinkage of the belt and adhesive. Moreover, it is desirable to provide an adhesive, which allows for a belt flexible enough to withstand 180° bend or crease without cracking, yet strong enough to withstand multiple cycling.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

SUMMARY OF THE INVENTION

Embodiments of the present invention include: an endless seamed flexible belt comprising a first end and a second end, each of the first end and the second end comprising a plurality of mutually mating elements which join in an interlocking relationship to form a seam, the belt comprising a substrate and the seam comprising an adhesive comprising a polyamide.

In addition, embodiments of the present invention include: an endless seamed flexible belt comprising a first end and a second end, each of the first end and the second end comprising a plurality of mutually mating elements which join in an interlocking relationship to form a seam, said belt comprising a polyimide substrate, and the seam comprising an adhesive comprising an alcohol-soluble polyamide and an electrically conductive filler.

Embodiments further include: an image forming apparatus for forming images on a recording medium comprising: a charge-retentive surface to receive an electrostatic latent image thereon; a development component to apply toner to the charge-retentive surface to develop the electrostatic latent image to form a developed image on said charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and the seam comprising an adhesive comprising a polyamide; and a fixing component to fuse the developed image to the copy substrate.

BRIEF DESCRIPTION OF THE DRAWINGS

For a better understanding of the present invention, reference may be had to the accompanying figures.

FIG. 11 is a graph of conductivities (S/cm) as a function of applied field (V/cm) for samples of polyamide adhesives, which do not include a filler.

FIG. 12 is a graph of conductivities (S/cm) as a function of applied field (V/cm) for samples of polyamide adhesives after various amounts, of carbon black have been added.

DETAILED DESCRIPTION OF THE PRESENT INVENTION

The present invention relates to an endless flexible seamed belt having a puzzle cut seam, wherein the seam comprises an adhesive comprising a polymer and optionally, an electrically conductive filler. In preferred embodiments, the polymer is a polyamide material. The invention provides, in embodiments, an adhesive system useful to seam puzzle cut seamed belts, wherein the height differential between the seam and the rest of the belt is virtually nil, and wherein the occurrence of ripples and tenting in the seam is reduced or eliminated. The present invention further provides, in embodiments, an adhesive that has a low temperature rapid cure in order to increase production of the belts at a reduced production cost. Further, the present invention provides, in embodiments, an adhesive that is resistant to alcohol and organic solvents. The adhesive system, in embodiments, also allows the seam to have thermal and mechanical characteristics closely matching those of the robust substrate. The present invention, in embodiments allows for a belt flexible enough to withstand 180° bend or crease without cracking, yet strong enough to withstand multiple cycling. The adhesive has electrical and mechanical properties which, in embodiments, can withstand transients in temperatures between 25 and 130° C., and is resistant to changes in humidity. In addition, the invention, in embodiments, provides an adhesive having electrical, mechanical and toner release characteristics that closely match those of the substrates. Moreover, the invention, in embodiments, provides a seam, which is Imageable, thereby reducing or eliminating the presence of print or copy defects. Moreover, the seam, in embodiments, allows for extended life of the belt.

In preferred embodiments, the belt is an intermediate transfer belt, sheet, roller, or film useful in xerographic, including digital, apparatuses. However, the belts herein having a seam comprising a polyamide and optional filler can be useful as belts, rollers, drelts (a hybrid of a drum and a belt), and the like, for many different processes and components such as, photoreceplors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and dry powder xerographic architectures, although dry is preferred.

Figure 1:
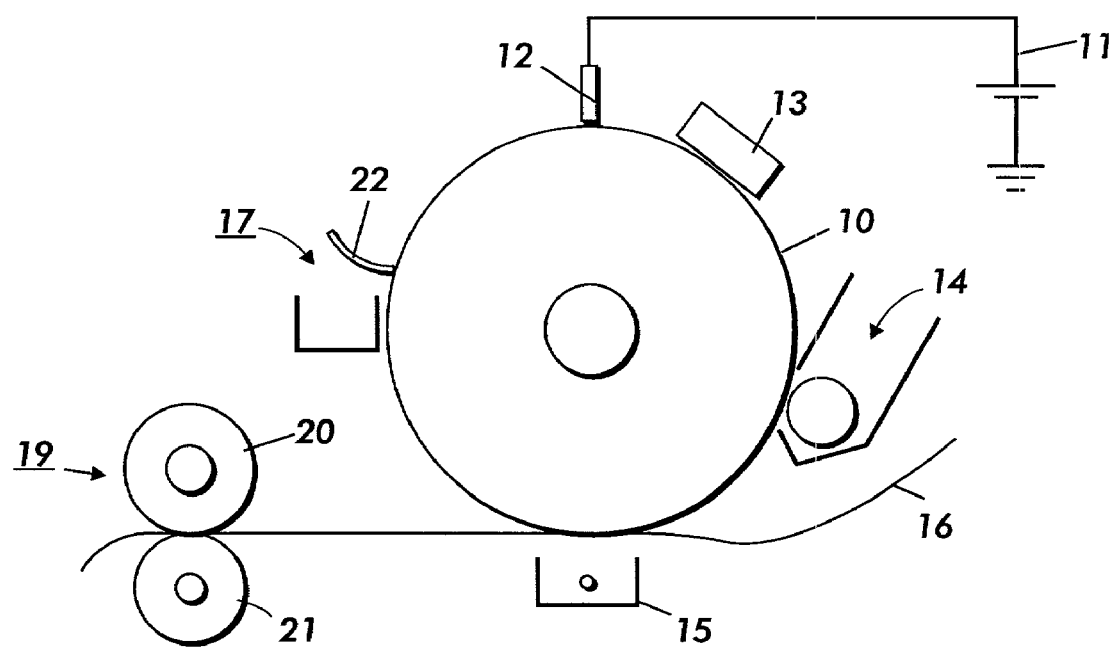
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner, specifically, photoreceptor 10 is charged on its surface by means of: an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
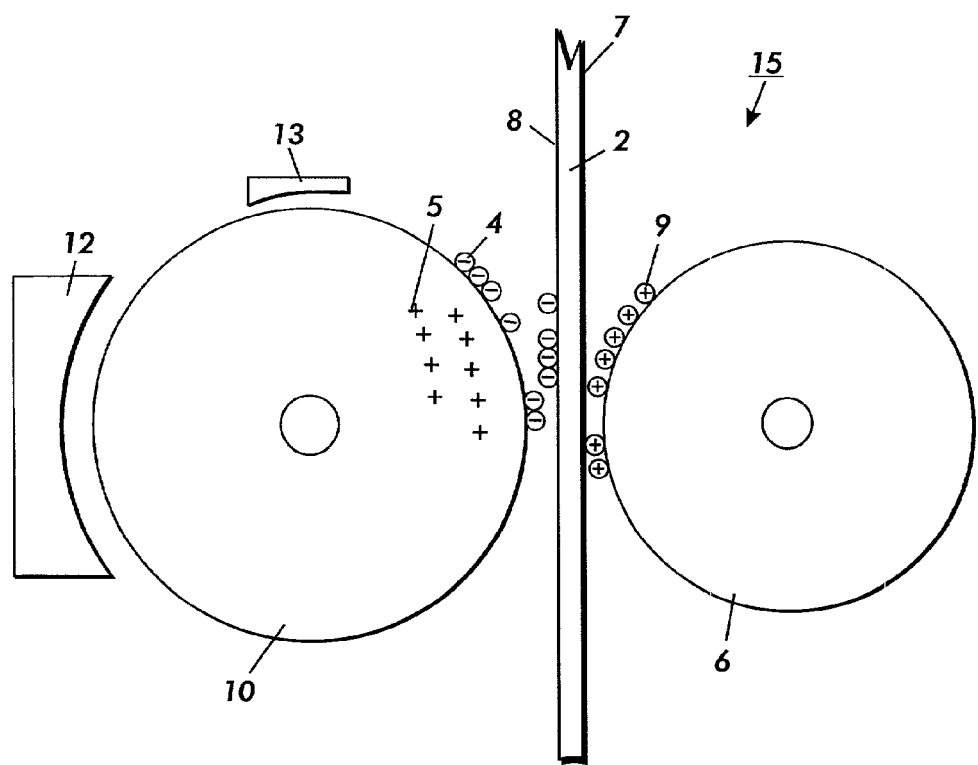
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is, a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor have been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
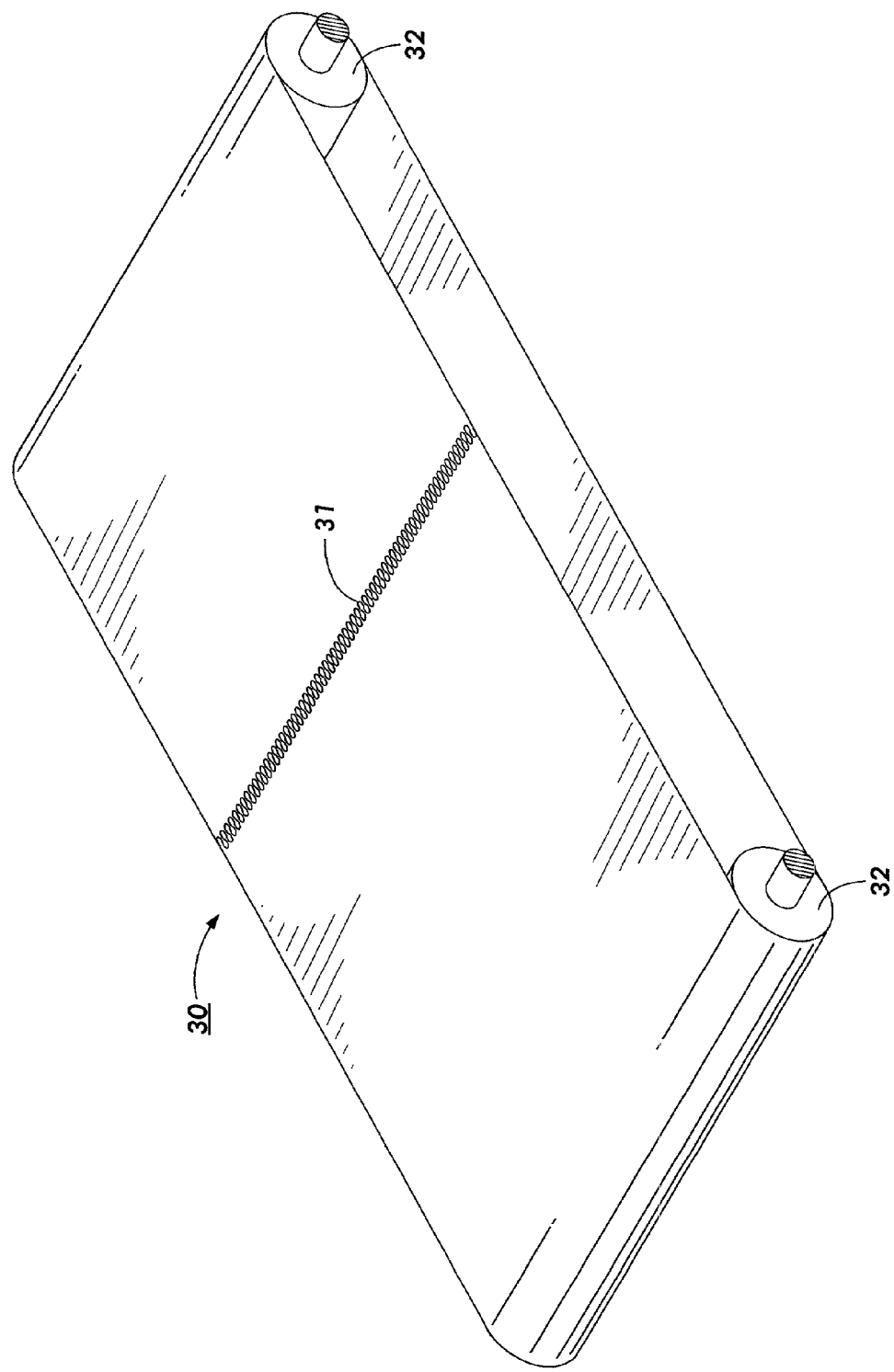
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In a preferred embodiment, the belt ends are held together by the geometric relationship between the ends of the belt material, which are fastened together by a puzzle cut. The puzzle cut seam can be of many different configurations, but is one in which the two ends of the seam interlock with one another in a manner of a puzzle. Specifically, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. In the present invention, the seam including the puzzle cut members, is held together by a polyamide adhesive, which is compatible with the rest of the belt. The belt, in embodiments, provides improved seam quality and smoothness with substantially no thickness differential between the seam and the adjacent portions of the belt.

Figure 4:
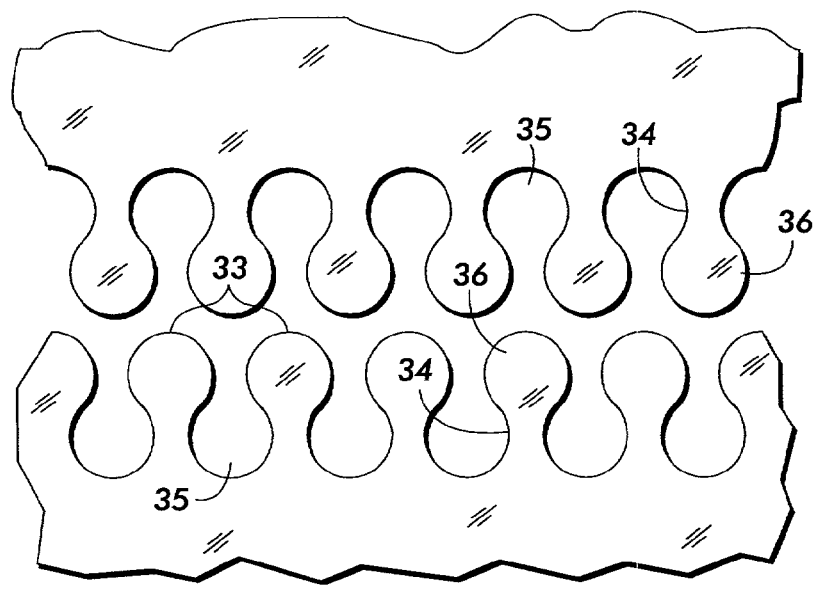
FIG. 4 is an enlargement of a puzzle cut seam having a multiplicity of head and neck members according to one embodiment of the present invention.
Figure 5:
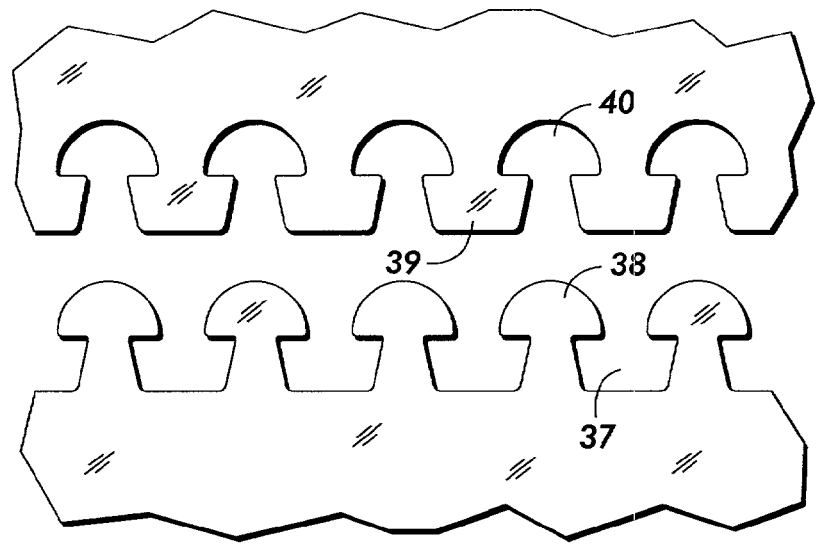
FIG. 5 is an enlargement of a puzzle cut seam having mushroom-shaped puzzle cut members according to another embodiment of the present invention.
Figure 6:
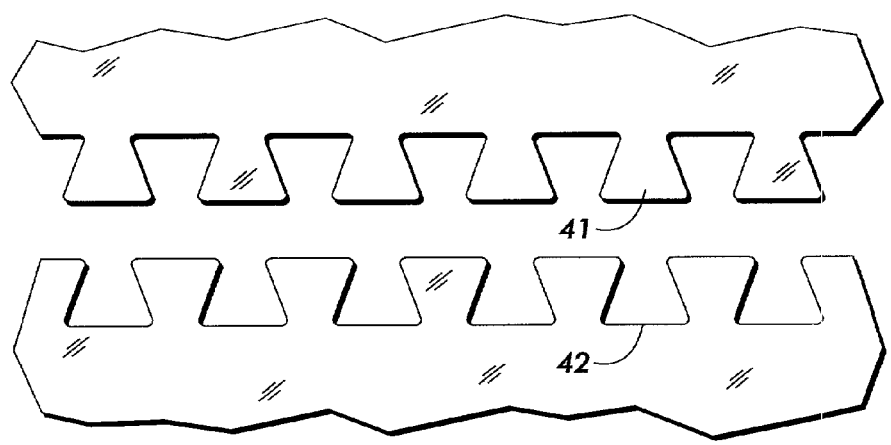
FIG. 6 is an enlargement of a puzzle cut seam having dovetail members according to another embodiment of the present invention.
Figure 7:
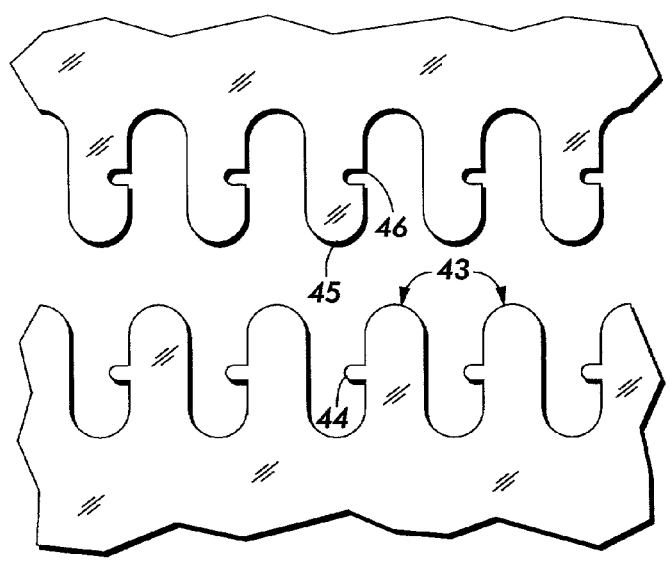
FIG. 7 is an enlargement of a puzzle cut seam having receptacles (recessors) and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress between the interlocking elements and permit them to separate when traveling around curved members such as the rolls 32 of FIG. 3. It has been found that with curved mating elements that the stress is lower than with square corners where rather than the stress being uniformly distributed it is concentrated leading to possible failure.

Figure 8:
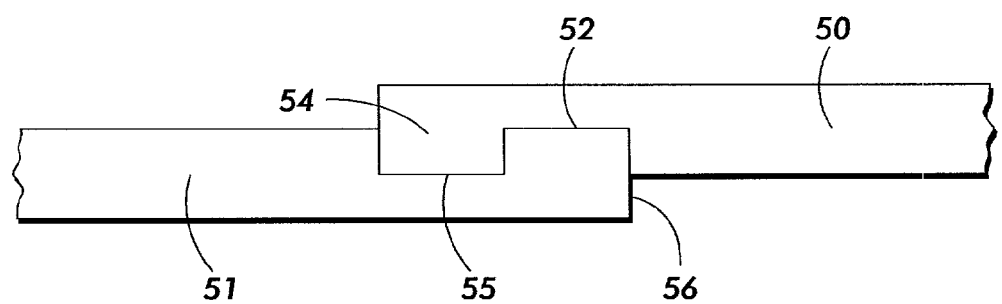
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

In embodiments, the height differential between the seam and the rest of the belt (the nonseamed portions of the belt) is practically nil, or from about 0 to about 25 micrometers, preferably from about 0.0001 to about 25 micrometers, and particularly preferred of from about 0.01 to about 5 micrometers.

Figure 9:
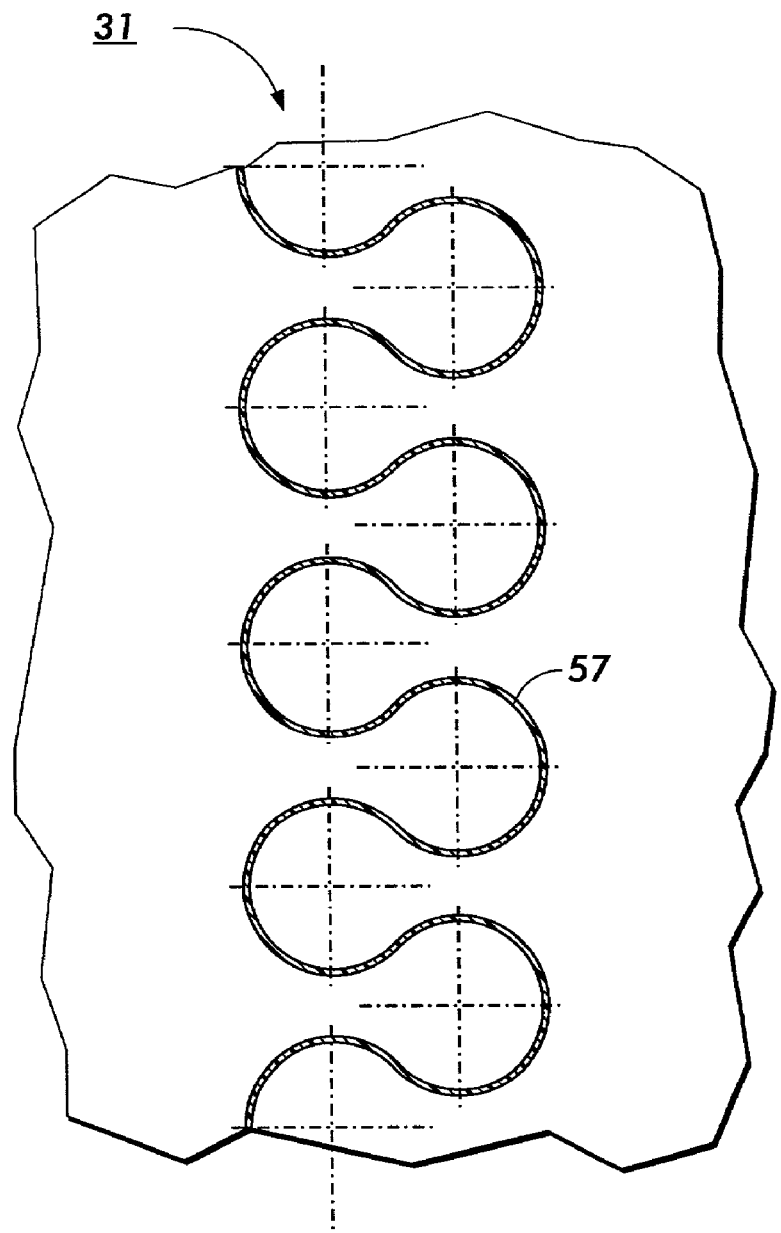
FIG. 9 is an enlarged version of a belt according to one embodiment of the present invention and demonstrates a crevice between the puzzle cut members, the crevice containing an adhesive.

A polyamide resin is preferably present between the seam, and placed in the crevice between the puzzle cut members to a thickness of from about 0.001 to about 50 micrometers. As shown in one embodiment of a puzzle cut seam 31 according to the present invention, the adhesive is present between the puzzle cut members and at the seam crevice 57 of FIG. 9

The adhesive is preferably chosen to have a resistivity within the range desired for electrostatic transfer of toner. Preferably, the resistivity of the seam is the same or similar to that of the belt in order to provide the same electrical properties for the seam and the rest of the belt. A preferred volume resistivity for toner transfer performance is from about $10^1$ to about $10^{13}$ ohms-cm, and preferably from about $10^9$ to about $10^{13}$ ohms-cm. When the belt and the seam of the belt have a same or substantially the same electrical resistance, the toner transfer at the seam is the same or substantially the same as the transfer at the belt. Such transfer at the seam provides an invisible or substantially invisible seam.

The electrical properties can be tailored by varying the amount of fillers, by changing the type of filler added, and/or by changing the curing procedure.

A preferred adhesive for use with a belt seam, preferably a puzzle cut belt seam, is a polyamide resin. In embodiments, the polyamide resin is alcohol-soluble. By "alcohol-soluble," Applicants refer to materials, which dissolve in alcohols such as butanol, ethanol, methanol and the like. In embodiments, the polyamide resin in the adhesive has functional pendant groups selected from the group consisting of methoxy, ethoxy and hydroxy pendant groups. In embodiments, the pendant functional group is a methoxy methylene group. In embodiments, the polyamide has the following formula:

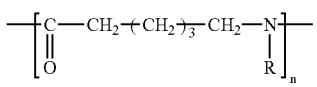

wherein n is a number of from about 50 to about 1,000, or from about 150 to about 500, or about 270, and wherein R is selected from the group consisting of hydrogen; alkyl having from about 1 to about 20 carbons, or from about 1 to about 10 carbons, such as methyl, ethyl, propyl and the like; alkoxy having from about 1 to about 20 carbons, or from about 1 to about 10 carbons such as methoxy, ethoxy, propoxy and the like; alkyl alkoxy having from about 1 to about 20 carbons, or from about 1 to about 10 carbons such as methyl methoxy, methyl ethoxy, ethyl methoxy, methyl dimethoxy, methyl trimethoxy, and the like; and alkylene alkoxy having from about 1 to about 20 carbons, or from about 1 to about 10 carbons such as methylene methoxy, ethylene ethoxy, and the like. In embodiments, monomers of the above formula can be included in an adhesive composition, wherein R in the monomers can be hydrogen, methylene methoxy, and methylene dimethoxy, or R in the adhesive composition can be from about 40 to about 80 mole percent hydrogen, or from about 50 to about 65 mole percent hydrogen, or about 64 percent hydrogen; and from about 20 to about 45 mole percent methylene methoxy, or from about 30 to about 35 mole percent methylene methoxy, or about 32 mole percent methylene methoxy; and from about 1 to about 10 mole percent methylene dimethoxy, or from about 1 to about 5 mole percent methylene dimethoxy, or about 4 mole percent methylene dimethoxy. Typical commercially available alcohol-soluble polyamide polymers suitable for use herein include those sold under the trade names LUCKAMIDE® 5003 from Dai Nippon Ink, NYLON® 8, CM4000® and CM8000® both from Toray Industries, Ltd., and other N-methylene methoxy pendant polyamides such as those prepared according to the method described in Sorenson and Campbell, "Preparative Methods of Polymer Chemistry," second edition, pg. 76, John Wiley & Sons, Inc., 1968, and the like, and mixtures thereof.

A suitable, fine powder, conductivity-enhancing filler that is uniformly dispersed without large agglomerates in the above resins, can be used with the present adhesive. In embodiments, the filler is a carbon filler, metal oxide filler, polymer filler, charge transporting molecule or mixtures thereof. Other conductive fillers include silicon powder, quaternary salts such as quaternary ammonium salts (for examples Adogen 464 sold by Aldrich Chemical as methyltrialkyl ($C_8$-$C_{10}$) ammonium chloride), and pyrolyzed polyacrylonitrile particles and fibers.

In embodiments, the filler is a carbon filler, such as carbon black, graphite, fluorinated carbon, or mixtures thereof. Preferred fluorinated carbons include those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly (dicarbon monofluoride) which is usually written in the shorthand manner $(C_2F)_n$. Preferred fluorinated carbons selected include those described in U.S. Pat. No. 4,524,119 to Luly et al., the subject matter of which is hereby incorporated by reference in its entirety, and those having the tradename ACCUFLUOR®, (fluorinated carbons from Advanced Research Chemicals, Inc., Catoosa, Okla.). Examples include ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

Preferred metal oxide fillers include titanium dioxide, tin (II) oxide, aluminum oxide, indium-tin oxide, magnesium oxide, copper oxide, iron oxide, and the like, and mixtures thereof.

Preferred polymer fillers include polypyrrole, polyacrylonitrile (for example, pyrolyzed polyacrylonitrile), polyaniline, polythiophenes, and mixtures thereof.

Examples of charge transporting molecules include bis (dihydroxy diethylamino-)triphenyl methane (DHTPM), bis (diethylamino) triphenyl methane (TPM), dihydroxy tetraphenyl biphenylene diamine (DHTBD), and the like, and mixtures thereof. Particularly preferred charge transporting molecules include DHTPM and DHTBD.

In embodiments, the filler is present in the adhesive in an amount of from about 1 to about 80, and preferably from about 20 to about 50percent by weight of total solids. Total solids, as used herein, refers to the amount of polymer resin, filler, crosslinking agent, other additives, and other solids present in the adhesive.

Crosslinking agents can be used in combination with the polyamide to promote crosslinking of the polymer, thereby providing a strong bond. Examples of suitable crosslinking agents include oxalic acid, p-toluene sulfonic acid, phosphoric acid, sulfuric acid, and the like, and mixtures thereof. In embodiments, the crosslinking agent is oxalic acid.

The adhesive solution may be applied at the seam and between interlocking seaming members, by any suitable means such as using a cotton-tipped applicator, liquid dispenser, glue gun and other known means. An amount in slight excess of the amount required to completely fill the seam kerf when dry of adhesive is added between interlocking seaming members.

The adhesive may be applied at the seam and between interlocking seaming members by using a solid film tape of the adhesive. The adhesive is melted into the seam kerf under applied temperature and pressure. Continued heating allows the resin to crosslink.

In general, the process for seaming using the adhesive herein involves compounding the resin with the filler, followed by forming the liquid-phase composite into a solid phase, thin layer, adhesive film. Crosslinking agents such as oxalic acid can be used. The adhesive film composite, with or without a removable release backing, is then applied to align with only the puzzle-interlocked seamed region of the belt or film member. The seam can then be cured by various methods. Curing procedures useful in curing the seam include room temperature moisture curing, thermal curing and infrared curing. Examples of heat curing include use of moderate heat once the adhesive is placed in the seam crevice. This moderate heating also increases the crosslinking/solidification reaction and increases the seam processing and belt fabrication speed.

The adhesive allows for low-temperature rapid curing, enabling faster production of belts. In embodiments, the adhesive may be cured between the seaming members at a time of from about 1 minute to about 1 hour, preferably from about 20 to about 30 minutes, at a temperature of from about 80 to about 180° C., and preferably from about 100 to about 120° C. Heat may be applied by, for example, a heat gun, oven, Vertrod or Sencor seam welder, or other suitable means.

The substrate is preferably robust enough to undergo multiple cycling through rigorous use. Examples of suitable substrate materials include polyimides with or without conductive fillers, such as semiconductive polyimides such as polyaniline polyimide, carbon filled polyimides, carbon filled polycarbonate, and the like. Examples of commercially available polyimide substrates include KAPTON® and UPLIEX® both from DuPont, and ULTEM® from GE.

The substrate may include a filler. Preferably, the filler, if present in the substrate, is present in an amount of from about 1 to about 60, and preferably from about 3 to about 40 percent by weight of total solids. Examples of suitable fillers for use in the substrate include carbon fillers, metal oxide fillers, doped metal oxide fillers, other metal fillers, other conductive fillers, and the like. Specific examples of fillers include carbon fillers such as carbon black, silicon particles, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; and polymer particles such as polytetrafluoroethylene, polypyrrole, polyaniline, doped polyaniline, and the like, and mixtures thereof.

Figure 10:
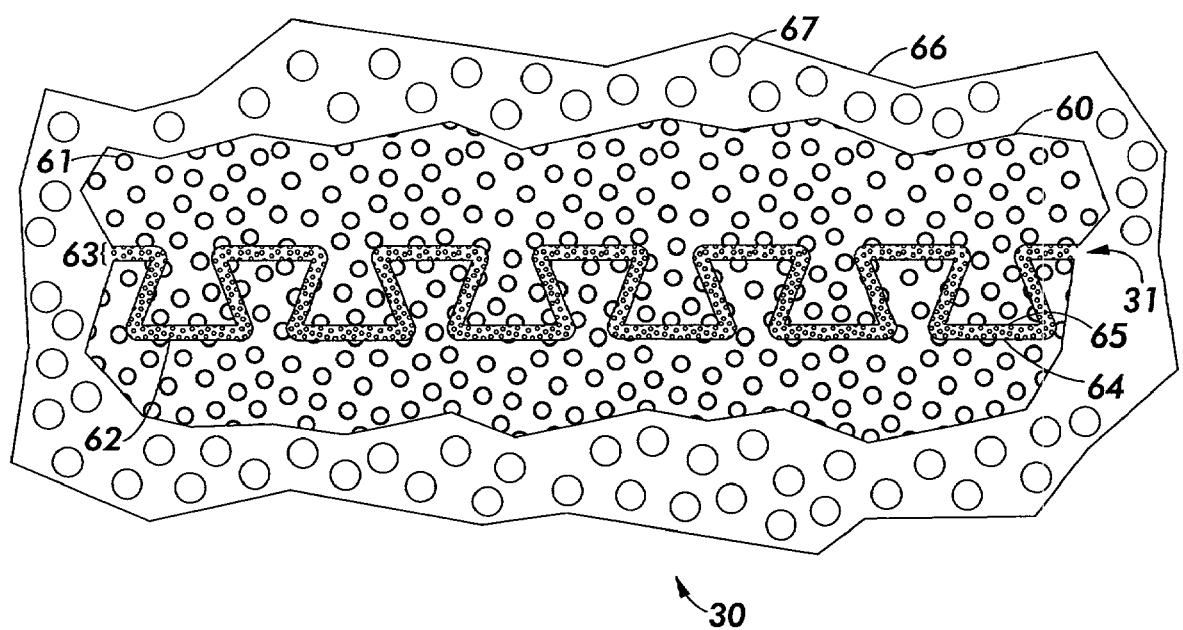
FIG. 10 is an enlarged cross-sectional view of a belt according to a preferred embodiment of the invention.

An example of a preferred belt used in combination with the polyamide resin adhesive is depicted in FIG. 10. The belt 30 comprises a substrate 60, having therein, in preferred embodiments, conductive fillers 61. The belt contains seam 31 having an adhesive 63 positioned between the seam members 64 and 65. In a preferred embodiment, conductive fillers 62 are dispersed or contained in the adhesive. Conductive fillers 61 optionally dispersed or contained in the substrate and fillers 62 optionally contained or dispersed in the adhesive, may be the same or different.

The adhesive herein provides an excellent seam adhesive for belts, and lo in preferred embodiments, polyimide intermediate transfer belts.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Intermediate Transfer Belt

A polyimide film substrate was obtained from DuPont. The belt substrate comprised polyaniline and carbon filled polyimide. The resistivity was tested and found to be from about $10^9$ to about $10^{10}$ ohm-cm. The belt ends that were to be joined were treated with a primer shortly before assembly, to help improve adhesion. The puzzle cut ends were wiped with a 10% solution of 3-Aminopropyltriethoxysilane (Aldrich) in toluene and allowed to dry for 10 min at 40° C.

Optionally, the belt ends to be joined can be subjected to a "chemical etch" treatment to help improve adhesion. The puzzle cut ends can be dipped in 1N aqueous NaOH solution for about 10 minutes, followed by 10 minutes in 1N aqueous HCl solution. The ends can then be rinsed with distilled water and allowed to dry.

Example 2

Preparation of Polyamide Adhesive (Sample 1)

The following were combined in an 8-ounce amber bottle and heated with magnetic stirring in a water bath at about 60° C. to make Sample 1: about 4 grams LUCKAMIDE® (from Dai Nippon Ink), about 10 grams methanol, and about 10 grams 1-propanol. A solution formed within 30 minutes. This solution was then allowed to cool to about 25° C. Subsequently, about 0.3 grams of trioxane (a crosslinker) and about 0.4 grams oxalic acid were added and the mixture was warmed under about 50° C. tap water until a solution formed. The liquid adhesive was then ready to apply to a puzzle cut seam.

Alternatively, a "Hot Melt" LUCKAMIDE® adhesive is prepared by solvent coating a film (3 to 5 mil dry thickness) of the adhesive on a release substrate, such as corona treated IFS3 Industrial Fluorosilicone Release Film Number 44461 from Mylan Technologies, Inc., St. Albans, Vt., or TEDLAR® release films from E.I. du Pont de Nemours and Company. The solvent is then allowed to evaporate in an oven at about 50° C. (well under its curing temperature of 110 to 130° C.) for 1 hour. Strips of the dried semiconductive LUCKAMIDE® adhesive on the release film are cut slightly wider than the puzzle cut seam and are used to weld (under heat and pressure) the puzzle cut seam together.

To produce a less conductive coating composition, less oxalic acid and/or less DHTBD can be used. To produce a more conductive matrix, the addition of carbon black rendered the composition considerably more conductive, because carbon black injects charges into the hole conducting matrix under the influence of applied electrical fields.

Example 3

Preparation of Polyamide Adhesive (Sample 2)

The formulation described in Example 2 was prepared, except that 3.6 grams of DHTBD was used instead of 4 grams, and 0.4 grams of either triphenyl methane (TPM) or dihydroxy triphenyl methane (DHTPM) was used. This adhesive was Sample 2.

Example 4

Preparation of Polyamide Adhesive with Various Amounts of Carbon Black (Samples 3-8 and Group Samples A-D)

Samples 3-8 were made as follows. To a 60-mL brown amber bottle with TEFLON® sealed cap were added: LUCKAMIDE® (4 g), DHTBD (4 g), trioxane (0.3 g, 7.5 wt. %), and various amounts of Black Pearls, 2000 carbon black as follows: Sample 3—(0.04), Sample 4—(0.2 g), Sample 5 (0.2 g), Sample 6—(0.4 g), Sample 7—(0.6 g), and Sample 8—(0.8 g), and a 1 to 1 mixture of methanol and 1-propanol (20 grams) were added. The LUCKAMIDE®, DHTBD, carbon black and solvent were heated at 160° F. in a water bath to form a dispersion in which all the ingredients except the carbon black dissolved. Steel shot (60 g) was then added and the capped container was roll-milled or paint shaken for at least 16 hours. Oxalic acid (a crosslinker) was then added in Group Sample A (0.3 g, or 7.5 weight percent based on LUCKAMIDE®), Group Sample B (0.4 g, 10 weight percent based on LUCKAMIDE®), Group Sample C (0.6 g., 15 weight percent based on LUCKAMIDE®) and Group Sample D (0.8 g, 20 weight percent based on LUCKAMIDE®).

Example 5

Preparation of Polyamide and Carbon Black Adhesive (Samples 9-11).

To a 60-mL brown amber bottle with TEFLON® sealed cap were added: LUCKAMIDE® (4 g), and a 1 to 1 mixture of methanol and 1-propanol (20 grams). Black Pearls® 2000 carbon black (0.4 grams in Sample 9, 0.6 grams in Sample 10, and 0.8 grams in Sample 11) were then added. The LUCKAMIDE®, DHTBD, carbon black and solvent were heated at 160° F. in a water bath to form a dispersion in which all the ingredients except the carbon black dissolved. Steel shot (60 g) was then added and the capped container was roll milled or paint shaken for at least 16 hours. Oxalic acid (0.3 g, or 7.5 wt. % based on LUCKAMIDE®) was then added.

Example 6

Preparation of Polyamide Adhesive with Elvamide (Sample 12)

To a 60-mL brown amber bottle with TEFLON® sealed cap were added: LUCKAMIDE® (1 g), ELVAMIDE® (4 g), DHTBD (5 g), trioxane (0.3 g) and a 1 to 1 mixture of methanol and 1-propanol (20 grams). The LUCKAMIDE®, DHTBD, and solvent were heated in a water bath at 160° F. to form a solution in which all the ingredients dissolved. Oxalic acid (0.3 grams, or 7.5 wt. % based on LUCKAMIDE®) was then added. This was Sample 12.

Example 7

Preparation of Polyamide Adhesive with Elvamide (Sample 13)

Sample 13 was formed by repeating the procedure set forth in Example 6 except that the following changes in ingredients were made: LUCKAMIDE® (2 grams) and ELVAMIDE® (2 grams).

Example 8

Preparation of Polyamide Adhesive with PPAN at Various Temperatures (Samples 14-19)

To a 60-mL brown amber bottle with TEFLON® sealed cap were added: LUCKAMIDE® (2 grams), pyrolyzed polyacrylonitrile (PPAN) powder (2 grams), and a 1 to 1 mixture of methanol and 1-propanol. The LUCKAMIDE®, DHTBD, PPAN and solvent were heated at 160° F. in a water bath to form a dispersion in which all the ingredients dissolved except the pyrolyzed polyacrylonitrile. Steel shot (60 grams) was then added and the capped container was roll milled or paint shaken for at least 16 hours. Oxalic acid (0.3 grams, or 7.5 wt. % based on LUCKAMIDE®) and trioxane (0.15 grams) were then added. PPAN samples were made by heating polyacrylonitrile (Aldrich) at 400° C. for 4 hours (in Sample 14), 350° C. for 4 hours (in Sample 15), 325° C. for 6 hours (in Sample 16), 300° C. for 8 hours (in Sample 17), and 260° C. for 8 hours (in Sample 18). Sample 19 was made as a control for comparison in which LUCKAMIDE® (3 grams), solvent (10 grams), trioxane (0.225 grams), and oxalic acid (0.45 grams) were combined in solution.

Example 9

Preparation of Polyamide Adhesive Tapes with Various Amounts of PPAN (Samples 20-24)

Freestanding adhesive tapes were made as follows. To a 60-mL brown amber bottle with TEFLON® sealed cap were added: LUCKAMIDE® (3 grams), particles of polyacrylonitrile pyrolyzed at 300° C. for 8 hours (1.0 g in Sample 20, 1.5 grams in Sample 21, 1 gram in Sample 22, and 0.75 grams in Sample 23), trioxane (0.3 grams) and a 1 to 1 mixture of methanol and 1-propanol (15 grams). The LUCKAMIDE®, DHTBD, and solvent were heated at 160° F. in a water bath to form a solution in which all the ingredients dissolved. Steel shot (60 grams) was then added and the capped container was roll milled or paint shaken for at least 16 hours. Oxalic acid (0.225 grams) was then added. The dispersions were coated using a 30 mil gap square applicator onto a corona-treated release paper (Avery, Paper 116626 4N, Buffalo, N.Y.) and air-dried overnight (16 hours) at room temperature in a fume hood. The coated dry films were about 70 microns thick and were easily peeled from the release paper. The free-standing tapes were stored in a freezer at −21° C. to preserve life. These tapes were compared to another tape (Sample 24) prepared by following the same procedure using ELVAMIDE® (3 grams), PPAN (1 grams), solvent (15 grams), and with no acid and no trioxane.

Example 10

Preparation of Polyamide and Carbon Black Adhesive Tapes (Samples 25-26)

Freestanding adhesive tapes were made as follows. To a 120-mL brown amber bottle with TEFLON® sealed cap were added: LUCKAMIDE® (8 grams), Black Pearls® 2000 carbon black (Cabot, 0.4 grams in sample A, 0.8 grams in sample B), trioxane (0.6 grams) and a 1 to 1 mixture of methanol and 1-propanol (40 grams). The LUCKAMIDE®, DHTBD, and solvent were heated at 160° F. in a water bath to form a solution in which all the ingredients dissolved. Glass beads (60 grams) were then added and the capped container was roll milled or paint shaken for at least 16 hours. Oxalic acid (0.6 grams) was then added. The dispersions were coated using a 30 mil gap square applicator onto corona-treated release paper (Avery, Paper 116626 4N, Buffalo, N.Y.) and air-dried overnight (16 hours) at room temperature in a fume hood. The coated films were about 70 microns thick and were easily peeled from the release paper. The free-standing tapes were stored in a freezer at −21° C. to preserve life. These tapes (Sample 25) were compared to another tape (Sample 26) prepared following the same procedure using ELVAMIDE® (3 grams), PPAN (1 grams), solvent (15 grams), and with no acid and no trioxane.

Example 11

Conductive Polyamide Adhesive Composition with Various Amounts of Adogen 464 as Release Tape (Samples 27-32)

LUCKAMIDE® (4 grams), methanol (10 grams) and 1-propanol (10 grams) were combined with ADOGEN® 464 (at between 1 and 25 weight percent based on LUCKAMIDE®) in a 4-ounce amber bottle and heated with magnetic stirring in a water bath at about 60° C. A solution formed within 30 minutes, which was then allowed to cool to 25° C. Trioxane (0.3 grams) and oxalic acid (0.4 grams) were added, and the mixture was warmed under 50° C. tap water until a solution formed. The adhesive was ready to apply to puzzle-cut seams, or alternatively, a hot melt adhesive tape was made as follows.

Release paper (Avery, Buffalo, N.Y.) was corona treated, and the adhesive was applied using a 25-mil gap applicator to the corona treated release paper. The coated wet film was then air-dried for at least two hours while the release paper was immobilized under reduced pressure on a platen. The dried adhesive tape was then easily removed from the substrate as a free-standing film at about 80 µm in thickness. If not immediately used, the adhesive tape was then stored in a freezer at −15° C. The adhesive tape was then trimmed to a 4-mm wide strip of about 18-inches in length and applied to the puzzle-cut seam of the intermediate belt substrate using a contact welder set at 248° F. under an applied pressure of 90 to 100 psi for 10 minutes. The seamed cylindrical belt was then post-cured in an oven set at 120° C. for 30 minutes. The flashing about the welded seam was then removed by polishing. The resistivity of the tape was measured at 500 volts with a Hiresta IP resistivity meter (Mitsubishi Petrochemical Co.). A cylindrical belt made in this way did not show light-dark puzzle-cut seam print out in a Docucolor 12 test fixture under a functional range of printer operating conditions in C zone. Bond strength of the seam was in excess of 19 pounds per linear inch, and the cured adhesive was resistant to organic solvents such as methanol. Samples had the following amounts of ADOGEN® 464 (weight percent based on LUCKAMIDE®): Sample 27 (0.05 grams, 1 weight percent), Sample 28 (0.1 grams, 2.5 weight percent), Sample 29 (0.2 grams, 5 weight percent), Sample 30 (0.3 grams, 7.5 weight percent), Sample 31 (0.5 grams, 12.5 weight percent), and Sample 32 (1.0 grams, 25 weight percent).

Example 12

Preparation of Polyamide Adhesive Film without a Filler (Samples 33-36)

The following were combined in an 8-ounce amber bottle and heated with magnetic stirring in a water bath at about 60° C.: LUCKAMIDE® (4 grams) obtained (from Dai Nippon Ink), methanol (10 grams), and 1-propanol (10 grams). A solution formed within 30 minutes. This solution was then allowed to cool to about 25° C. Subsequently, the following components were added to the solution:

Sample 33: 0.3 grams Trioxane based on weight percent of LUCKAMIDE®

Sample 34: 0.3 grams Trioxane and 10 weight percent TPM (0.4 grams in 1.6 gram THF)

Sample 35: 0.3 gram Trioxane and 0.3 gram Oxalic Acid

Sample 36: 0.3 grams Trioxane, 10 weight percent TPM and 0.3 grams Oxalic Acid

The mixtures were warmed under about 50° C. tap water until a solution formed. The adhesives were coated on Myst-R substrates (Data Instruments 100 Discovery Way, Action, Mass. 01778) at a thickness of approximately 16 microns. On top of these films, 0.25 inch gold electrodes were sputtered for electrical contact. FIG. 11 depicts the volume, DC conductivities as a function of applied field that were obtained from standard, unguarded current-voltage measurements.

The oxalic acid oxidizes DHTBD with the effect of increasing the density of free charge carriers; hence, it increases the conductivity. TPM has a tendency to trap or complex, and as a consequence, it is expected to have the opposite effect. Samples with and without TPM did not show a significant change in mobility. This result confirms that the mechanism is through changes in the charge carrier density rather than through the mobility.

Example 13

Preparation of Polyamide Adhesive Film with Carbon Black Filler (Samples 37-40)

To the Sample in Example 12, BLACK PEARLS® 2000 carbon black (1 weight percent) was added as charge injection centers. Samples were prepared and measured as in Example 12. Resulting conductivities are shown in FIG. 12. Samples 37 through 40 in FIG. 12 correspond to Samples 33 through 36, respectively, in FIG. 11, except that Samples 37 through 40 include the addition of carbon. The whole set of Example 11 is shifted upwards and the departure from ohmic behavior is at earlier fields due to the injecting nature of carbon.

Example 14

Preparation of Polyamide Adhesive Film with Carbon Black Filler

The following were combined in an 8-ounce amber bottle and heated with magnetic stirring in a water bath at about 60° C.: about 4 grams LUCKAMIDE® (from Dai Nippon Ink), about 10 grams methanol, and about 10 grams 1-propanol. A solution formed within 30 minutes. This solution was then allowed to cool to about 25° C. Then, trioxane (7.5 weight percent based on LUCKAMIDE®), oxalic acid (7.5 weight percent based on LUCKAMIDE:®) were added and BLACK PEARLS® 2000 carbon black was added in amounts of 0.5, 1.0, 2.5 and 5 weight percents.

Figure 13:
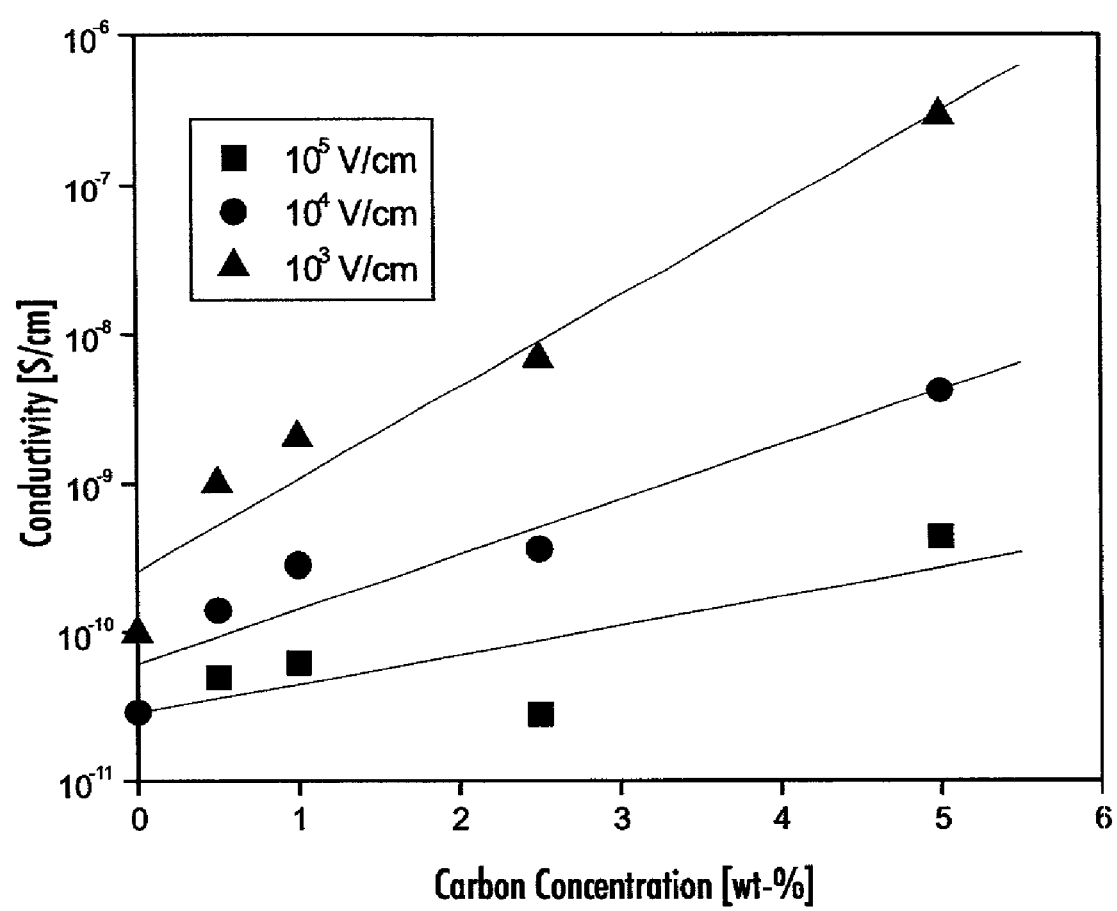
FIG. 13 is a graph of conductivities of these samples as a function of the carbon black loading at different field strengths.

FIG. 13 shows conductivities of these samples as a function of the carbon black loading at different field strengths.

Example 15

Preparation of Luckamide (Polyamide) and DHTBD Adhesive

An amount of about 100 grams LUCKAMIDE® was added to a mixture of 150 grams methanol and 150 grams 1-propanol in a 1000-ml bottle. The bottle was warmed to about 60° C. until the resin completely dissolved. To the warm LUCKAMIDE® solution was added 60 grams DHTBD and the solution mixed well until all the solid dissolved. To this solution was then added 4.2 grams of oxalic acid dissolved in a minimal amount of methanol and also 14 grams of BLACK PEARLS® 2000 (carbon black) dispersion. The mixture was placed on a roll mill for 1 hour to ensure complete mixing.

The resulting dispersion was drawcoated onto a sheet of TEDLAR®. A suitable sized coating bar was used. The coating was allowed to dry in a drying oven set at about 40° C. for about 3 hours. Once the film was dry, it was kept on the release liner and was ready for use as a seam adhesive. The prepared adhesive tape was stored at below 0° C. to maintain shell life.

The stock dispersion of carbon black was prepared earlier by attriting 10 grams of BLACK PEARLS® 2000 along with 10 grams LUCKAMIDE® dispersed in 150 grams 1-propanol for about 3 hours, using a bench top attritor charged with 3/16" stainless steel shot media. The slurry was filtered through a course screen to separate out the media and the carbon dispersion was collected in an 8 ounce polyethylene bottle.

Example 16

Preparation of LUCKAMIDE® and Fluorinated Carbon Adhesive

A stock solution of LUCKAMIDE® was first prepared by dissolving 50 grams LUCKAMIDE®, 3.5 grams trioxane and 3.5 grams oxalic acid in a mixture of 60 grams methanol and 150 grams 1-propanol in a 500 ml bottle. Separately into a 4 ounce glass bottle were added 15 grams of ethyl acetate, 0.15 grams of ACCUFLUOR® 2028 and 0.20 grams ACCUFLUOR® 2010 (fluorinated carbons from Advance Research Chemicals, Inc., Catoosa, Okla.). The carbon blacks were then dispersed in the solvent by mixing and placing the bottle in an ultrasonic bath for about 10 to 15 minutes. To the bottle was then added 0.10 grams DIAK3® (Dupont) and the dispersion was again mixed well. To this bottle was added 27 grams of the LUCKAMIDE® stock solution and the mixture was placed on a roll mill for about 1 hour.

The resulting dispersion was drawbar coated onto a sheet of releasing film. A suitable sized coating bar was used. The coating was allowed to dry in a drying oven set at about 40° C. for about 3 hours. Once the film was dry, it was kept on the release paper and was ready for use as a seam adhesive.

At this stage, the film did not exhibit any controlled conductivity. In fact, conductivity was only achieved when the film was subjected to a second thermal post-cure step. A 0.001 inch thick sample adhesive film coated on stainless steel substrate and post-cured at about 120° C. for about 30 minutes was observed to have a bulk resistivity of about $10^{10}$ ohm-cm. This formulation was repeated and the electrical results were found to be reproducible. The resistivity was tuned by adjusting the amount and/or type of fluorinated carbon, curatives, and post-cure parameters.

Example 17

Preparation of Image-on-Seam Puzzle Cut Seamed Belt

The two puzzle cut ends of the polyimide film prepared in Example 1 were brought together and aligned on the lower jaw of a Technoseal Vertrod Thermal Impulse Heat Sealer (Mod. 20EP/P-1/4-WC-CAN-DIG-I) with the assistance of vacuum holddown tables mounted on both sides of a welder. A freestanding film of the adhesives/release layer (preferably about 8 to about 80 microns thick) formed in accordance with any of the examples above were selected. A narrow strip (about 1 to about 4 cm) of material was cut to a length and width sufficient to adequately cover the puzzle-cut seam area on the belt substrate. The strip of adhesive/release layer was laid across the top of the seam area covering the seam. The welder was set to a nominal impulse temperature of about 120° C., equivalent to the crosslinking temperature of the LUCKAMIDE®. The seam was welded with applied temperature and pressure for 10 minutes to compression mold the adhesive into the seam kerf, filling it completely. This also initiated crosslinking of the adhesive. Post curing at 120° C. for an additional 30 minutes was required to further crosslink and improve the mechanical properties of the adhesive.

Other methods of hot melt adhesive bonding could be used as well. For example, a heated roll or heated shoe that could move along the seam can be used.

The seamed belt was removed from the fixture, post cured, and the seam was subjected to finishing (sanding) and polishing steps to remove excess adhesive and bring the seam area topography in line with the rest of the belt.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An endless seamed flexible belt comprising a first end and a second end, each of the first end and the second end comprising a plurality of mutually mating elements which join in an interlocking relationship to form a seam, the belt comprising a substrate and the seam comprising an adhesive comprising an alcohol-soluble polyamide having the following general formula:

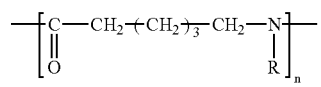

wherein R is selected from the group consisting of hydrogen; alkyl having from about 1 to about 20 carbons, alkoxy having from about 1 to about 20 carbons, alkyl alkoxy having from about 1 to about 20 carbons, and alkylene alkoxy having from about 1 to about 20 carbons, and wherein n is a number of from about 50 to about 1,000.

2. An endless seamed flexible belt in accordance with claim 1, wherein said alcohol-soluble polyamide comprises pendant groups selected from the group consisting of methoxy, ethoxy and hydroxy pendant groups.

3. An endless seamed flexible belt in accordance with claim 2, wherein said pendant groups are methylene methoxy pendant groups.

4. An endless seamed flexible belt in accordance with claim 1, wherein R is a methylene methoxy group.

5. An endless seamed flexible belt in accordance with claim 1, wherein said adhesive further comprises an electrically conductive filler.

6. An endless seamed flexible belt in accordance with claim 5, wherein said electrically conductive filler is a quaternary ammonium salt.

7. An endless seamed flexible belt in accordance with claim 5, wherein said electrically conductive filler is selected from the group consisting of carbon fillers, metal oxide fillers, polymer fillers, charge transporting molecules, and mixtures thereof.

8. An endless seamed flexible belt in accordance with claim 7, wherein said electrically conductive filler is a carbon filler selected from the group consisting of carbon black, graphite, fluorinated carbon, and mixtures thereof.

9. An endless seamed flexible belt in accordance with claim 7, wherein said electrically conductive filler is a metal oxide filler selected from the group consisting of titanium dioxide, tin oxide, indium tin oxide, iron oxide, aluminum oxide, and mixtures thereof.

10. An endless seamed flexible belt in accordance with claim 7, wherein said electrically conductive filler is a polymer filler selected from the group consisting of polypyrrole, polyacrylonitrile, polythiophene, polyaniline and mixtures thereof.

11. An endless seamed flexible belt in accordance with claim 7, wherein said electrically conductive filler is a charge transporting molecule selected from the group consisting of bis(dihydroxy diethylamino) triphenyl methane, bis(diethylamino) triphenyl methane, dihydroxy tetraphenyl biphenylene diamine, and mixtures thereof.

12. An endless seamed flexible belt in accordance with claim 1, wherein said adhesive is crosslinked.

13. An endless seamed flexible belt in accordance with claim 12, wherein said adhesive is crosslinked using oxalic acid as a crosslinking agent.

14. An endless seamed flexible belt in accordance with claim 13, wherein said adhesive comprises an electrically conductive filler selected from the group consisting of carbon black, graphite, fluorinated carbon, silicon particles, and mixtures thereof.

15. An endless seamed flexible belt in accordance with claim 1, wherein said substrate comprises a polymer selected from the group consisting of polyimide and polycarbonate.

16. An endless seamed flexible belt in accordance with claim 15, wherein said polyimide is a polyaniline polyimide.

17. An endless seamed flexible belt in accordance with claim 1, wherein said seam has a volume resistivity of from about $10^1$ to about $10^{13}$ ohms-cm.

18. An endless seamed flexible belt in accordance with claim 17, wherein said seam has a volume resistivity of from about $10^9$ to about $10^{11}$ ohm-cm.

19. An endless seamed flexible belt in accordance with claim 1, wherein said belt is an intermediate transfer belt.

20. An endless seamed flexible belt in accordance with claim 1, wherein said plurality of mutually mating elements are in the form of a puzzle cut pattern.

21. An endless seamed flexible belt in accordance with claim 20, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

22. An endless seamed flexible belt in accordance with claim 21, wherein said first projection and said second receptacle are curved.

23. An endless seamed flexible belt comprising a first end and a second end, each of the first end and the second end comprising a plurality of mutually mating elements which join in an interlocking relationship to form a seam, said belt comprising a polyimide substrate, and the seam comprising an adhesive comprising an alcohol-soluble polyamide and an electrically conductive filler, wherein said alcohol-soluble polyimide has the following general formula:

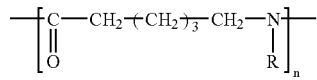

wherein R is selected from the group consisting of hydrogen; alkyl having from about 1 to about 20 carbons, alkoxy having from about 1 to about 20 carbons, alkyl alkoxy having from about 1 to about 20 carbons, and alkylene alkoxy having from about 1 to about 20 carbons, and wherein n is a number of from about 50 to about 1,000.

* * * * *